United States Patent
Gurin

(10) Patent No.: US 8,691,293 B2
(45) Date of Patent: Apr. 8, 2014

(54) LOW INFLAMMATORY BLENDED OILS

(75) Inventor: Michael H Gurin, Glenview, IL (US)

(73) Assignee: Omega Foods, LLC, Two Rivers, WI (US)

( * ) Notice: Subject to any disclaimer, the term of this patent is extended or adjusted under 35 U.S.C. 154(b) by 0 days.

(21) Appl. No.: 13/428,033

(22) Filed: Mar. 23, 2012

(65) Prior Publication Data

US 2012/0264832 A1    Oct. 18, 2012

Related U.S. Application Data

(60) Provisional application No. 61/632,827, filed on Apr. 17, 2011.

(51) Int. Cl.
*A61K 36/00*    (2006.01)
*A61K 36/889*   (2006.01)
*A61K 36/55*    (2006.01)

(52) U.S. Cl.
USPC ............................ 424/725; 424/768; 424/727

(58) Field of Classification Search
None
See application file for complete search history.

(56) References Cited

U.S. PATENT DOCUMENTS

2007/0196445 A1 *   8/2007   Abbruzzese et al. ......... 424/439

FOREIGN PATENT DOCUMENTS

CN       101731369 A  *  6/2010

OTHER PUBLICATIONS

Jalc et al, Effect of microbial oil and fish oil on rumen fermentation and metabolism of fatty acids in artificial rumen, Czech Journal of Animal Science (2009), 54 (5), 229-237.*

* cited by examiner

*Primary Examiner* — Qiuwen Mi
(74) *Attorney, Agent, or Firm* — David G. Rosenbaum; Eric J. Choi; Rosenbaum IP

(57) ABSTRACT

A low inflammatory oil composition and method for supplementing feed, nutrition and diet systems with omega-3 to omega-6 balanced oils comprised of a synergistic blend of at least two oils. The composition further comprises a synergistic blend of long chain omega-3 oil as a means to further increase the nutritional value. The composition further provides an effective increase in reducing inflammation for therapeutic, and pharmacological treatment in addition to general nutrition and diet systems.

5 Claims, No Drawings

LOW INFLAMMATORY BLENDED OILS

CROSS-REFERENCE TO RELATED APPLICATIONS

This application claims priority from U.S. Provisional Application Ser. No. 61/632,827, filed on Apr. 17, 2011, the entirety of which is incorporated by reference.

It is an object of the invention to maximize the bioavailability and serving size of omega-3 long chain PUFA "O3-PUFA" by preparing an O3-PUFA delivery system that minimizes adverse enzymatic and oxidation reactions both from manufacturing to consumption of the delivery system and during consumption of delivery system.

Hi Oleic Peanut Oil, hereinafter referred to as "Peanut-Hi9", has both <3.5% of linoleic, preferably <3.2%, and specifically preferred <2.95% on a weight basis, w/oleic >75% and specifically preferred >79% on a weight basis.

High-oleic Moring a Oleifera seed oil, hereinafter referred to as "MO-Hi", has both <3.0% of linoleic, preferably <2.0%, and specifically preferred <1.0% on a weight basis, with an oleic composition >70% and specifcally preferred >74% on a weight basis.

High linolenic Flax Oil, is hereinafter referred to as "Flax-Hi3", has a linolenic to linoleic ratio >6, preferably >6.2, specifically preferred >6.4, and also linolenic >65%, preferably >68%, specifically preferred >72% on a weight basis.

Salvia hispanicaL.(chia), is hereinafter referred to as "Salba", is the most nutritionally dense form of chia. There are over 80 generic strains of chia, and Salba is a blend of the only two registered varieties—SahiAlba 911 & 912.

One embodiment of the O3-PUFA delivery system is an omega-3 long chain PUFA concentrate comprised of multiple oils resulting in an aggregate of omega-6 to omega-3 long chain PUFA ratio is from 0.01 to 2.8. The preferred ratio is between 0.01 to 0.24. Of the multiple oils, the preferred second oil has an omega-9 to omega-6 ratio from 5 to 20, and is blended with an omega-3 enriched oil (e.g., fish oil, concentrate fish oil, microalgae oil such as Martek™, etc.) having a O3-PUFA content of at least 20 percent on a weight basis. The specifically preferred second oil has less than 2.5% by weight of linolenic acid in order to minimize oxidation between the manufacturing and consumption periods of time. Linolenic, which is a short chain omega-3, does not have a competing interaction with long-chain omega-3, but as noted will adversely impact shelf life. The particularly preferred second oil also has an omega-6 to omega-3 long chain PUFA ratio from 0.01 to 2.8, and more preferably between 0.01 to 0.24; and an omega-9 to omega-6 ratio of at least 5 to 1 (preferably between about 50 to 1, and more preferably between from about 20 to 5, and particularly preferable between from about 50 to 20).

The omega-3 long chain PUFA concentrate is subsequently added to a wide range of consumer products including food, beverage, nutritional supplement, or pharmaceutical products having an omega-3 dosage of greater than 50 mg per serving, but at least 30 mg per serving. The particularly preferred formulation, notably for food products that are rich in oil (e.g., mayonnaise, salad dressings, peanut butter, etc.) utilize oils having an aggregate of omega-6 having a weight % less than 5%, though preferably less than 2.1%.

Another embodiment incorporates at least 2% of pineapple juice on a weight basis to the omega-3 long chain PUFA weight. A preferred formulation further comprises a sinapyl compound including the sinapyl compound as isolated from pineapple juice. The particularly preferred formulation does not require pineapple juice, but utilizes a sinapyl compound as isolated from pineapple juice into the omega-3 long chain concentrate. Alternatively, the concentrate contains a sulfur containing antioxidant particularly when iron is present in the food, beverage, nutritional supplement, or pharmaceutical products. The particularly preferred sulfur containing antioxidant is isolated from broccoli. Yet another alternative antioxidant, and the specifically preferred, contains at least one of sulforaphane and a sulforaphane precursor glucosinolate including sulforaphane glucosinolate. Another embodiment of antioxidant is ferulic acid, particularly from coffee fruit.

Another embodiment is the resulting blended oil having an omega-6 to omega-3 ratio from 0.1:1 to 1:3, and at least the first oil and the second oil containing less than 6% by weight of linolenic acid.

Yet another embodiment of the low inflammatory omega-3 blend is where the omega-6 to omega-3 ratio is from 0.01 to 1.0.

It is well known in the art, that the vast majority of antioxidants when utilized at high levels become pro-oxidant. A particularly preferred blend of antioxidant is a curcumin C3 complex on a weight basis of at least 10 ppm, and Vitamin E of at least 100 ppm. A specifically preferred blend alternatively includes a manganese oxide emitting a blue color at ambient temperatures on a weight basis of at least 10 ppm, and Vitamin E of at least 100 ppm.

A preferred method of utilizing the omega-3 long chain PUFA concentrate is to prepare the omega-3 long chain PUFA oil into an emulsion (preferably a microemulsion, and particularly preferred as a nanoemulsion) with the antioxidant subsequently added to the water phase with the already prepared omega-3 long chain PUFA concentrate micro- or nano-emulsion. The particularly preferred method of preparing the emulsion is the addition of medium chain triglyceride at a weight ratio to omega-3 long chain PUFA of at least 0.25 to 3, and an emulsifier at a ratio to omega-3 long chain PUFA of at least 0.25 to 3. The prepared micro- or nano-emulsion is then subsequently added to a food or beverage product at a level of at least 35 to 2000 mg of omega-3 long chain PUFA per serving.

It is known in the art that a high level of phytosterols provides oxidative stability benefits to omega-3, but excessive levels detract from the efficacy of omega-3. The inventive use of phytosterols therefore must be less than 24% by weight of phytosterols. It is also known that phytosterols converted from non-esterified phytosterols to triglyceride-recrystallized phytosterols provide superior performance, but the inventive recrystallized phytosterols are converted from non-esterified phytosterols to triglyceride-recrystallized phytosterols using medium chain triglycerides. The triglyceride-recrystallized phytosterols is infused into the omega-3 long chain PUFA concentrate by at least one of the sequential steps of:

Adding the triglyceride-recrystallized phytosterols to at least 10% by weight of carbon dioxide, Increasing the pressure of the combined triglyceride-recrystallized phytosterols and carbon dioxide to a pressure at least 3 psi greater than the supercritical pressure of carbon dioxide and a temperature of at least 2 F greater than the supercritical temperature of carbon dioxide, Adding the combined triglyceride-recrystallized phytosterols and carbon dioxide supercritical mixture to the omega-3 long chain PUFA under rapid expansion conditions to concurrently recrystallize the phytosterols to crystal size of less than 1000 nm to 20 nm and decreasing the temperature of the triglyceride-recrystallized phytosterols to less than 40 C within 60 seconds.

Yet another embodiment of the omega-3 long chain PUFA concentrate utilizes at least one of vegetal chitosan and chitin-glucan at 0.1 to 4.0 percent by weight of a second oil wherein the at least one of vegetal chitosan and chitin-glucan is mixed into the second oil prior to being incorporated into the omega-3 long chain PUFA concentrate. Without being limited by theory, the vegetal chitosan and/or chitin-glucan preferentialy adsorbs the second oil (i.e., the non-omega-3 long chain PUFA containing oil) limiting it's bioavailability while providing an "encapsulant" around the omega-3 long chain rich portion of the micro- or nano-emulsion. Maximizing the adsorption of the non-omega-3 long chain oil is preferentially achieved inclusion of the at least one of vegetal chitosan and chitin-glucan into the second oil, preferentially combined with supercritical carbon dioxide at a ratio of between 100 and 0.5 for second oil to supercritical carbon dioxide.

The preferred sources of ingredients utilized in the invention are:

Vegetal chitosan and/or chitin-glucan from KitoZyme.

Second oil is coconut oil. The more preferred is a high oleic peanut oil including cultivars AT-201, GA-02C, and FR-458. The specifically preferred is MO-Hi.

Ferulic acid is from coffee fruit by KonaRed of Sandwich Isles Trading Company, Inc.

At least 2% of pineapple juice on a weight basis to the omega-3 long chain PUFA weight. Preferred is sulforaphane and a sulforaphane precursor glucosinolate including sulforaphane glucosinolate from pineapple.

Curcumin C3 complex on a weight basis of at least 10 ppm, inositol on a weight basis of at least 50 ppm and mixed tocotrienols of at least 100 ppm Manganese oxide emitting a blue color at ambient temperatures, as known in the art by Mas Subramanian of Oregon State University in Corvallis Medium chain triglyceride is MC-5 from Stepan

TABLE 1

Master batch in grams, except as noted otherwise

| Example | $2^{nd}$ Oil e.g., Peanut Oil GA-O2C | Fish Oil 50% | Fish Oil 20% | Medium Chain Triglycerides | Emulsifier | Vitamin E (ppm) |
|---|---|---|---|---|---|---|
| MB-1 | 100 | 100 | 0 | 100 | 100 | 100 |
| MB-2 | 20 | 100 | 0 | 50 | 100 | 100 |
| MB-3 | 0 | 100 | 0 | 100 | 100 | 100 |
| MB-4 | 100 | 100 | 0 | 20 | 100 | 50 |
| MB-5 | 20 | 100 | 0 | 20 | 120 | 100 |
| MB-6 | 20 | 0 | 60 | 80 | 80 | 60 |
| MB-7 | 100 | 50 | 0 | 0 | 100 | 0 |

TABLE 2

Master batch Plus in ppm, except as noted

| Example | Coffee Fruit | Vitamin E | Sulforaphane Glucosinolate | Curcumin C3 Complex | Manganese Oxide |
|---|---|---|---|---|---|
| AD-1 | 100 | 100 | 0 | 0 | 0 |
| AD-2 | 100 | 100 | 0 | 0 | 20 |
| AD-3 | 0 | 100 | 0 | 0 | 0 |
| AD-4 | 0 | 100 | 0 | 0 | 20 |
| AD-5 | 0 | 100 | 0 | 0 | 100 |
| AD-6 | 0 | 400 | 0 | 0 | 50 |
| AD-7 | 0 | 400 | 100 | 0 | 0 |
| AD-8 | 0 | 200 | 200 | 0 | 0 |
| AD-9 | 0 | 200 | 0 | 100 | 20 |
| AD-10 | 100 | 400 | 0 | 0 | 50 |
| AD-11 | 100 | 400 | 100 | 0 | 20 |
| AD-12 | 0 | 400 | 100 | 100 | 20 |

TABLE 3

Finished Consumer Product

| Food product in grams | Second Oil, e.g., Peanut Oil GA-O2C | Master batch for OCLC mg per serving | Additive for 100 ppm on oil weight fraction | Pineapple Juice for g per serving | Medium Chain Triglycerides for g per serving |
|---|---|---|---|---|---|
| Milk | 0 | any | any | 0 | 2 |
| Juice | 0 | any | any | 20 | 0 |
| Mayonnaise | balance of oil | any | any | 0 | 0 |
| Salad Dressing | balance of oil | any | any | 5 | 0 |
| Milk | balance for 2% | any | any | 0 | 0 |
| Juice | 0 | any | any | 200 | 0 |
| Mayonnaise | balance of oil | any | any | 0 | 0 |
| Salad Dressing | balance of oil | any | any | 0 | 0 |
| Milk | balance for 4% | any | any | 0 | 2 |
| Juice | 0 | any | any | 0 | 2 |
| Mayonnaise | balance of oil | any | any | 3 | 5 |
| Salad Dressing | balance of oil | any | any | 3 | 5 |

Chlorogenic Acid-Antioxidant with anti-inflammatory properties•Caffeic Acid-Antioxidant with anti-inflammatory properties•Ferulic Acid-Antioxidant and reactive toward free radicals such as reactive oxygen species (ROS)

PRIOR ART

A method for improving the glucose tolerance of a glucose intolerant individual comprising administering a lipid system comprising alpha-linolenic acid (C18:3n-3), omega-6 fatty acids, and omega-9 fatty acids wherein the ratio of said omega-6 fatty acids to said alpha-linolenic acid (C18:3n-3) is from about 0.25:1 to about 3:1, and the ratio of said omega-9 fatty acids to said alpha-linolenic acid (C18:3n-3) is from about 0.4:1 to about 3:1.

A method for improving the glucose tolerance of a glucose intolerant individual comprising administering a lipid system to said glucose intolerant individual, said lipid system comprising omega-3 fatty acids, omega-6 fatty acids, and omega-9 fatty acids wherein the ratio of said omega-6 fatty acids to said omega-3 fatty acids is between 0.25:1 and 3:1; and the ratio of said omega-9 fatty acids to said omega-3 fatty acids is between 0.4:1 and 3:1.

A nutritional supplement for administration to children, the nutritional supplement comprising: a protein component; a carbohydrate component; and a lipid component comprising a source of DHA, wherein the supplement has an omega.-6:.omega.-3 fatty acid ratio of about 6:1 or less.

A nutritional supplement for administration to children, the nutritional supplement comprising: a protein component; a carbohydrate component; and a lipid component comprising, in % w/w of the total lipid component: between about 10% and about 50% canola oil; between about 5% and about 40% soy oil; between about 5% and about 40% high oleic sunflower oil; between about 5% and about 40% medium chain triglyceride oil; between about 1% and about 20% corn oil; and between about 0.1% and about 10% of a source of DHA.

A prepared food product, comprising a cholesterol-free fat composition having a balanced mixture of fatty acids, comprising between 15% by weight and 40% by weight linoleic acid, between 20% and 40% by weight saturated fatty acid comprising at least one saturated fatty acid selected from the group consisting of lauric acid, myristic acid, and palmitic acid, and no more than 1% elaidic acid or other unnatural trans fatty acids by weight; wherein the ratio of polyunsaturated fatty acids, including linoleic acid, to saturated fatty acids is from 0.5:1 to 2:1, and wherein said fat composition and said food product are suitable for human or animal ingestion for increasing the HDL concentration and the HDL/LDL concentration ratio in the blood serum.

A cholesterol-free fat composition having a balanced mixture of fatty acids, comprising between 15% by weight and 40% by weight linoleic acid, between 20% and 40% by weight saturated fatty acids, wherein at least one said saturated fatty acid is selected from the group consisting of lauric acid, myristic acid, and palmitic acid, and no more than 1% elaidic acid or other unnatural trans fatty acids by weight; wherein the ratio of polyunsaturated fatty acids, including linoleic acid, to saturated fatty acids is from 0.5:1 to 2:1, and wherein said cholesterol-free fat composition is suitable for human or animal ingestion for increasing the HDL concentration and the HDL/LDL concentration ratio in the blood serum.

The nutritional additive of claim 2 wherein the ratio of omega-3 fatty acids to omega-6 fatty acids is greater than about 2.

Preferred Oil Formulations—Omega-3 Concentrate, hereinafter referred to as Low Inflammatory Oil "LI Oil"

The invention desires to achieve a balanced omega-3 to omega-6 ratio (i.e., greater than 1, and under all circumstances greater than 0.25 which remains superior to the oil ratio utilized within the classic Western diet). The oil blend is comprised of at least two oils, a first oil high in linolenic and a second oil high in ultra-low linoleic oil. A particularly preferred third oil further includes an omega-3 (in the form of DHA and/or EPA) concentrate wherein the omega-3 is greater than 25%, preferably greater than 50%, and specifically preferred greater than 55%.

The oil blend composition, is a blend of at least two oils comprised of a first oil Flax-Hi3 where the Flax-Hi3 is <8% (preferably <7.5%, specifically <7.4%) and a second oil of Peanut Oil—GA-O2C>91%. The oil blend has an oleic composition >60%, preferably >63%, and specifically >64.5%.

The oil blend composition, is a blend of at least two oils comprised of a first oil Flax-Hi3 where the Flax-Hi3 within the balanced Omega-3:Omega-6 oil (a ratio of >1) oil composition having <6% Flax-Hi3 oil, preferably <5%, and more specifically <4%; with a second oil of Peanut-Hi9 >95%, such that the blend has an oleic weight composition >65%, preferably >70%, and more specifically >74%.

Yet another oil blend composition, with the term oil blend composition interchangeably used as omega-3 concentrate, is a balanced Omega-3:Omega-6 oil (a ratio of >1) having a first oil of Flax-Hi3 of <2%, preferably <1.5%, and more specifically <1.0%; with a second oil of MO-Hi at a weight basis >98% such that the blended oil has an oleic weight basis >65%, preferably >70%, and more specifically >72%.

Yet another oil blend composition, with the term oil blend composition interchangeably used as omega-3 concentrate, is a balanced Omega-3:Omega-6 oil (a ratio of >1) having a first oil of Salba of <4%, preferably <1.5%, and more specifically <1.0%; with a second oil of MO-Hi at a weight basis >98% such that the blended oil has an oleic weight basis >65%, preferably >70%, and more specifically >72%.

Yet another oil blend composition, with the term oil blend composition interchangeably used as omega-3 concentrate, is a balanced Omega-3:Omega-6 oil (a ratio of >1) having a first oil of Salba of <4%, preferably <1.5%, and more specifically <1.0%; with a second oil of coconut oil at a weight basis >98% such that the blended oil has a linoleic weight basis <5%, preferably <3%, and more specifically <2%.

The oil blend is best with an omega-6 to omega-3 ratio from 0.01 to 2.8, and preferably from 0.3 to 1.2. More preferred is such that the omega-6 to omega-3 ratio is less than, such as from 0.5 to 0.99. The omega-3 content of the first oil has at least 20 percent on a weight basis, and the second oil has an omega-9 to omega-6 ratio from 5 to 90.

Achieving superior oil stability necessitates a minimum amount of omega-3, thus having a balanced omega-6 to omega-3 ratio will have an omega-3 oil blend that contains less than 6% by weight of linolenic acid and the omega-6 to omega-3 ratio is from 0.5 to 0.99.

More preferred is an oil blend that contains less than 4% linolenic by weight basis and specifically preferred is less than 2% linolenic.

The ultimate low inflammatory oil has less than 2% by weight basis of linoleic and an omega-6 to omega-3 ratio less than 1.

The best and healthiest method of achieving a balanced omega-6 to omega-3 ratio is by minimizing the weight percentage of linoleic acid. The preferred oleic weight percentage basis is greater than 60% or alternatively when using coconut oil the oleic weight percentage basis is less than 3%.

The particularly preferred oleic weight basis is greater than 65%, and the specifically preferred oleic weight basis is greater than 70%. The second oil preferably has an omega-9 to omega-6 ratio greater than 9, and preferably greater than 25. The first oil has a linolenic weight percentage greater than 70%. The first oil exception is the use of Salba that naturally has anti-inflammatory benefits further amplified by minimizing linoleic acid in the blend and the second oil exception is coconut oil that is virtually void of oils having carbon length greater than 13.

The omega-3 blend is further comprised of a third oil to incorporate long-chain omega-3, as compared to short chain (i.e., linolenic) having an omega-6 to omega-3 ratio from 0.01 to 0.20, wherein the third oil is comprised of at least 30% by weight of a combination of DHA and EPA.

Specific formulations of the oil blend are:
at least a first oil and a second oil resulting in a blended oil having an omega-6 to omega-3 ratio from 0.01 to 3, has a blended composition of at least 60% oleic acid, at least 0.5% linolenic acid, and at most 8.0% linoleic acid; or
at least 65% oleic acid, at most 8.0% linoleic acid, and at most 3.0% linolenic acid; or
at least 65% oleic acid, at most 4.0% linolenic acid, and at most 3.0% linoleic acid.

Food Products

The utilization of the preferred LI Oil is included a wide range of food and nutraceutical products as known in the art. It is further understood that dual (or otherwise known as isolated) packages such that the first oil and third oil are within one of the dual packages and the second oil is in the other of the dual packages. The inclusion of the LI Oil is utilized in the same method as inclusion of traditional food oils, omega-3 enriched oils, etc.

Each of the above formulations further utilize the omega-3 oil blend further comprised of a third oil containing at least 30% by weight of combined DHA and EPA. The now omega-6 to omega-3 oil blend is balanced and incorporated into at least one of a food, beverage, nutritional supplement, or pharmaceutical, and wherein the combination of DHA and EPA is at least 30 mg per serving.

The invention claimed is:

1. A low inflammatory omega-3 oil blend comprised of at least a first oil containing a ratio of linoleic acid to linolenic acid of less than or equal to 1:6 and a second oil resulting in a blended oil having an omega-6 to omega-3 ratio from 0.1:1 to 1:3, wherein the blend of at least the first oil and the second oil contains less than 6% by weight of linolenic acid.

2. The low inflammatory omega-3 blend according to claim 1, wherein the omega-6 to omega-3 ratio is from 0.01 to 1.0.

3. The low inflammatory omega-3 blend according to claim 1, wherein the first oil is at least one of Salba, High-oleic Moringa Oleifera seed, or High Linolenic Flax oil.

4. The low inflammatory omega-3 blend according to claim 1, wherein the second oil is at least one of coconut oil or Hi Oleic Peanut Oil.

5. The low inflammatory omega-3 oil blend according to claim 1, further comprised of a third oil containing at least 30% by weight of combined DHA and EPA, wherein the omega-3 oil blend is added to at least one of a food, beverage, nutritional supplement or pharmaceutical, and wherein the combination of DHA and EPA is at least 30 mg per serving.

* * * * *